(12) United States Patent
Zhang et al.

(10) Patent No.: US 9,637,387 B2
(45) Date of Patent: May 2, 2017

(54) METHOD FOR REPAIRING REDUCED GRAPHENE OXIDE

(71) Applicant: SHENZHEN CANTONNET ENERGY SERVICES CO., LTD, Shenzhen (CN)

(72) Inventors: Mingdong Zhang, Shenzhen (CN); Linde Zhang, Shenzhen (CN)

(73) Assignee: SHENZHEN CANTONNET ENERGY SERVICES CO., LTD, Shenzhen (CN)

( * ) Notice: Subject to any disclaimer, the term of this patent is extended or adjusted under 35 U.S.C. 154(b) by 0 days.

(21) Appl. No.: 15/109,816

(22) PCT Filed: Jan. 17, 2014

(86) PCT No.: PCT/CN2014/070801
§ 371 (c)(1),
(2) Date: Jul. 6, 2016

(87) PCT Pub. No.: WO2015/106436
PCT Pub. Date: Jul. 23, 2015

(65) Prior Publication Data
US 2016/0332886 A1   Nov. 17, 2016

(51) Int. Cl.
C01B 31/04   (2006.01)
(52) U.S. Cl.
CPC ........ C01B 31/043 (2013.01); C01B 31/0484 (2013.01)

(58) Field of Classification Search
CPC ............. C01B 31/043; C01B 31/0438; C01B 31/0446; C01B 31/0484
See application file for complete search history.

(56) References Cited

FOREIGN PATENT DOCUMENTS

| | | |
|---|---|---|
| CN | 101774575 A | 7/2010 |
| CN | 101844760 A | 9/2010 |
| CN | 103787318 A | 5/2014 |

OTHER PUBLICATIONS

Rozada, Rubén, et al. "Towards full repair of defects in reduced graphene oxide films by two-step graphitization." Nano Research 6.3 (2013): 216-233.*

(Continued)

Primary Examiner — Richard M Rump
(74) Attorney, Agent, or Firm — Gokalp Bayramoglu

(57) ABSTRACT

A method for repairing a reduced graphene oxide, the method comprising the following steps: Dispersing the reduced graphene oxide into a solvent to obtain a graphene dispersion liquid, adding a first Lewis acid and a compound containing a methyl or methylene group to obtain the first mixture, reacting the first mixture in a microwave environment of which power is 300~900 w for 0.5~2 hours, refluxing for 3~5 hours; separating, purifying and drying to obtain the first crude product; adding the first crude product into a second Lewis acid, adding an aromatic hydrocarbon repairing agent to obtain the second mixture, reacting the second mixture to obtain a molten solid, separating and purifying same to obtain the second crude product; mixing the second crude product, a metal powder catalyst and a third Lewis acid to obtain the third mixture, this method can repair reduced graphene oxide effectively.

18 Claims, 1 Drawing Sheet

(56) References Cited

OTHER PUBLICATIONS

Kim, Kyoung Hwan, et al. "High quality reduced graphene oxide through repairing with multi-layered graphene ball nanostructures." Scientific reports 3 (2013): 3251.*

Na, Zhao, et al. "Liquid-phase and solid-phase microwave irradiations for reduction of graphite oxide." Chinese Physics B 23.12 (2014): 128101.*

* cited by examiner

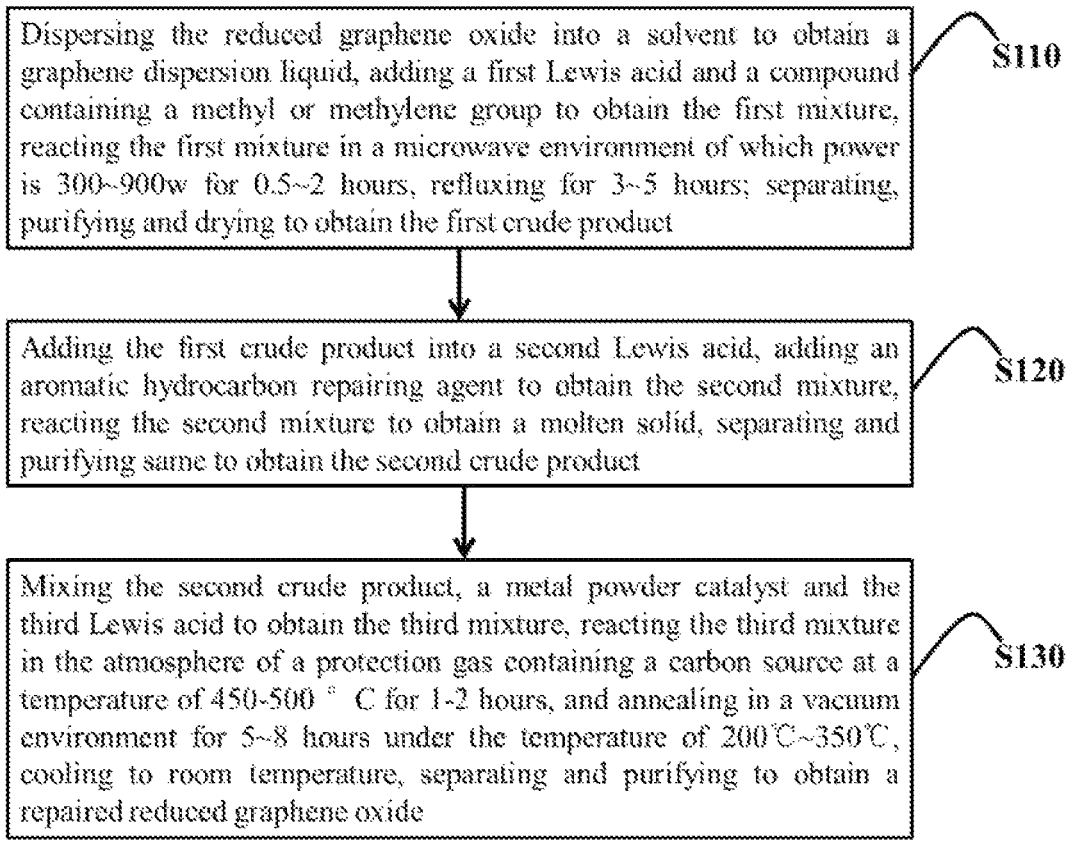

METHOD FOR REPAIRING REDUCED GRAPHENE OXIDE

TECHNICAL FIELD

The present invention relates to a carbon material technical field, specifically referring to a method for repairing a reduced graphene oxide.

BACKGROUND

Since Andre Geim and KonstaninNovoselof from University of Manchester in UK successfully stripped pyrolytic graphite out and observed graphene in 2004 (Novoselov K. S.; Geim, A. K.; Morozov, S. V; Jiang, D.; Zhang, Y.; Dubonos, S. V.; Grigorieva, I. V.; Firsov, A. A. Science 2004, 306, 666-9), the investigation of new carbon materials has been remaining a hot topic in relevant areas. The success of stripping graphene out breaks the prediction about thermal instability of two-dimensional crystal theoretically, and brings about possibilities for more investigations and explorations in new fields.

Perfect graphene is supposed to own ideal two-dimensional structure, which consists of hexagonal lattice. Every single carbon atom is combined with other three carbon atoms by σ-bond in the direction of lattice plane, and non-bonding electrons serves as π-electrons, forming π-orbit system vertical to the lattice plane. The π-electron could move randomly in the plane, which enables graphene to own fine electrical conductivity and sustain electric current whose density is six orders of magnitude more than copper. Graphene also owns record-breaking thermal conductivity. Thermal conductivity of pure graphene could reach 2000-4000 W/(m·K), and it also has excellent strength and large surface area. Besides, the special structure of graphene provides unique energy band structure and enables it with half integer quantum hall effect and perfect tunneling effect, as well as electrical conductivity that would never fade away. The special characteristics mentioned above guarantee graphene a promising prospect of application in fields of materials and electronic circuits. Therefore, is of great demand for the synthesis of graphene.

There're two traditional ways to synthesis graphene, which are physical method and chemical method respectively. Properties of graphene obtained through the two methods are different from each other. Physical methods include mechanical stripping, electric arc discharge, ultrasonic dispersion etc. Graphene layers obtained through physical methods are comparatively intact, but there're problems like low productivity, uncertainty of quality, command for special equipment and high cost. While chemical methods include bottom up organic synthesis, oxidation-reduction process, solvothermal synthesis and chemical vapor deposition. Equipment and raw materials are strictly required for organic synthesis method, so it's difficult to put into mass production in this way. Production quality isn't stable for solvothermal method, thus the average quality is poor. Chemical vapor deposition method costs too high and cannot achieve scale production. Among all those methods, only oxidation-reduction process can work without special equipment, and quality of graphene obtained through this method is stable. Thus it's the most suitable way for industrialized production. But there are two main questions about the graphene which run through oxidation-reduction process. Firstly, the intense oxidation-reduction reaction breaks the 6-membered carbocyclic rings in the graphene sheets, which end up with so called defects, and leads to the affection and interference of graphene material's property. Secondly, the graphene material obtained can't be reduced completely, which leads to the oxygen residual on the graphene sheets, which can also affect the property of graphene material. Therefore the graphene obtained is so called "reduction-oxidation graphene", By comparison the graphene material obtained by chemical vapor deposition is of less defects, and have no oxygen residual. Therefore in certain application range, this kind of graphene serve our needs better, which can be called "graphene" better.

As to reduced graphene oxide, there are couple of surface defects: 1. Stone-Wales(SW) topological defect, which is, the carbon atoms rearrangement happened in the two hexagonal rings, leads to the break of this structure then formed as a penta cyclic and a seven-membered-cycle. 2. Vacancy defect, which means one or more carbon atoms missed in the honeycomb pattern of graphene sheets, make the vacancy happened in the graphene. The vacancy can be classified as single vacancy defects and double vacancy defects. 3. Doping heteroatoms, which are, the carbon atoms of graphene adsorb the heteroatoms or be substituted by heteroatoms. As such of these vacancies, it makes the difference between chemical preparation and physical preparation, included the size of surface area, the scale of carbon and oxygen and energy gaps in the energy band structure exist or not and so on.

The properties of reduced graphene oxide are quite different from the graphene obtained by chemical vapor deposition, which is caused by the vacancies, therefore, we can design some catalytic steps for surface reconstruction, to make vacancies of graphene eliminated, meanwhile the residual oxygen can be removed, and the reduced graphene oxide obtained by chemical method turn out into high quality graphene, to reach the goal of preparing graphene of high quality at low cost, which is the research that is imperative.

However, the researches on repairing and reconstruction of graphene deficiencies are less reported, there is a large blank in this research; on the other hand, the reports focus on repairing carbon atoms of graphene by chemical vapor deposition method so far internationally, but the traditional organic synthesis method to repair graphene is less reported.

SUMMARY OF THE INVENTION

Based on above, it is necessary to offer a method to repair reduced graphene oxide, in order to repair the vacancies and deoxygenation.

A method for repairing a reduced graphene oxide includes following steps:

Dispersing the reduced graphene oxide into a solvent to obtain a graphene dispersion liquid, adding a first Lewis acid and a compound containing a methyl or methylene group to obtain a first mixture, reacting the first mixture in a microwave environment of which power is 300~900 w for 0.5~2 hours, refluxing for 3~5 hours; separating, purifying and drying to obtain a first crude product;

Adding the first crude product into a second Lewis acid, adding an aromatic hydrocarbon repairing agent to obtain a second mixture, reacting the second mixture to obtain a molten solid, separating and purifying same to obtain a second crude product; and Mixing the second crude product, a metal powder catalyst and a third Lewis acid to obtain a third mixture, reacting the third mixture in the atmosphere of a protection gas containing a carbon source at a temperature of 450-500° C. for 1-2 hours, and annealing in a vacuum environment for 5~8 hours under the temperature of 200° C.~350° C., cooling to room temperature, separating and purifying to obtain a repaired reduced graphene oxide.

In one of the embodiments, the solvent is chosen from at least one of dichloromethane, 1,2-dichloroethane, carbon tetrachloride, trichloromethane, cyclohexane, n-hexane, benzene and nitrobenzene.

In one of the embodiments, in the graphene dispersion liquid, the concentration of the reduced graphene oxide is 0.1 mg/mL~1 mg/mL.

In one of the embodiments, the first Lewis acid and second Lewis acid are all chosen from at least one of ferric chloride, aluminum chloride, zinc chloride, boron trifluoride, magnesium chloride, copper chloride, lithium chloride, the third Lewis acid is chosen from at least one of ferrous chloride, ferric chloride, lithium chloride, chromic chloride, cobalt chloride, zinc chloride, copper chloride.

In one of the embodiments, mass ratio between first Lewis acid and reduced graphene oxide is 1:3~10.

In one of the embodiments, the compound obtains methyl or methylene group is trioxymethylene, methanol, chloromethane or methyl iodide.

In one of the embodiments, mass ratio between the compounds obtains methyl or methylene group and reduced graphene oxide is 1:5~20.

In one of the embodiments, before reacting the first mixture in a microwave environment of which power is 300~900 w for 0.5~2 hours, there is another step which is adding a strong acid into the first mixture. the mass ratio between the strong acid and reduced graphene oxide is 1:0.1~1.

In one of the embodiments, the strong acid is chosen from at least one of sulfuric acid, methanesulfonic acid, bet acid, nitromethane, nitric acid, hydrochloric acid, trichloroacetic acid and perchloric acid.

In one of the embodiments, the mass ratio between the first crude product and the second Lewis acid is 1:20~100.

In one of the embodiments, the aromatics repairing agent is chosen from at least one of naphthalene, anthracene, phenanthrene, coronene, pyrene and perylene.

In one of the embodiments, the mass ratio between the first crude product and the second Lewis acid is 1:5~10.

In one of the embodiments, the steps of reacting the second compound into molten solid are:

Reacting the second compound under the temperature of 200° C.~350° C. for 3~5 hours; Or Reacting the second compound in a microwave environment of 300~800 W for 0.1~0.5 hours.

In one of the embodiments, the mass of metal powder catalyst is 5%~10% of the second crude product.

In one of the embodiments, the metal powder catalyst is chosen from at least one of copper powder, zinc powder, silver powder, palladium powder, platinum powder.

In one of the embodiments, the mass of the third Lewis acid is 0.1%~5% of the second crude product.

In one of the embodiments, the protect atmosphere contain carbon source is a mixture gas contains organic phase gas and inert gas, the organic phase gas is at least one of methane, ethylene and gaseous ethanol.

In one of the embodiments, the volume ratio between the organic phase gas and the inert gas is 1~3:7~9.

As the method for repairing a reduced graphene oxide above, under the catalyzing of the first Lewis acid, the Friedel-Crafts action and Scholl action reacted between the reduced graphene oxide and the compound contains methyl or methylene group, so the vacancy defects and double vacancy defects of reduced graphene oxide were repaired effectively; under the catalyzing of the second Lewis acid, the defects of larger size are grafted and replenished through Friedel-Crafts action, the vacancy defects of reduced graphene were moderate repaired, and deoxidize reduction of reduced graphene oxide was also accomplished; and then the annealing process of reduced graphene under the catalyzing of metal powder, the Stone-Wales (SW) topological defects remain were repaired effectively, also the single vacancy defect and double vacancy defects were activated. Meanwhile, with the supplement of carbon source and under the catalyzing of metal catalyst, the single vacancy defect and double vacancy defects of high-activity were repaired deeply, thus the high quality graphene is obtained.

BRIEF DESCRIPTION OF DRAWINGS

FIG. 1 is a flow chart of one mode of execution belongs to the method for repairing a reduced graphene oxide.

EMBODIMENTS

To make the invention clear and easy to understand, the detailed description for specific execution mode of this invention was accomplished combined with the FIGURE. The concrete details will be stated to understand the invention well. The invention can be executed by other ways which is different from this description; technicist of this field can do the similar improvement without against the connotation of this invention, therefore this invention is not restricted by the specific execution modes below.

Referring to FIG. 1, one specific execution mode of the method for repairing a reduced graphene oxide, includes following steps:

Step S110: Dispersing the reduced graphene oxide into a solvent to obtain a graphene dispersion liquid, adding a first Lewis acid and a compound containing a methyl or methylene group to obtain a first mixture, reacting the first mixture in a microwave environment of which power is 300~900 w for 0.5~2 hours, refluxing for 3~5 hours, separating, purifying and drying to obtain a first crude product;

Reduced graphene oxide (RGO) is a kind of graphene that produced by oxidation-reduction method and contains surface defects and oxygen.

The solvent was chosen from at least one of dichloromethane, 1,2-dichloroethane, carbon tetrachloride, trichloromethane, cyclohexane, n-hexane, benzene and nitrobenzene. Preferably, the solvent is chosen from at least one of dichloromethane, trichloromethane, nitrobenzene, n-hexane.

Preferably, before dispersing the reduced graphene oxide into a solvent, there are steps to make it washed and dried. Wash the reduced graphene oxide with anhydrous ethanol and water in turn; make it dried, to remove the inorganic salt or organics impurities, to obtain the reduced graphene oxide with high purity.

Preferably, dispersing the reduced graphene oxide which is washed and dried into the solvent in an ultrasonic environment, to make the reduced graphene oxide evenly dispersed.

Preferably, in the graphene dispersion liquid, the concentration of reduced graphene oxide is 0.1 mg/mL~1 mg/mL, to guarantee a certain handling capacity and reaction rate.

The first Lewis acid is chosen from at least one of ferric chloride ($FeCl_3$) aluminum chloride ($AlCl_3$), zinc chloride ($ZnCl_2$), boron trifluoride ($BF_3$) magnesium chloride ($MgCl_2.6H_2O$), copper chloride ($CuCl_2.2H_2O$), lithium chloride LiCl), preferably, the first Lewis acid is chosen from at least one of ferric chloride ($FeCl_3$), aluminum chloride ($AlCl_3$) and lithium chloride (LiCl).

As catalyst, the first Lewis acid, preferably, the mass ratio between it and reduced graphene oxide is 1:3~10.

The compound contains methyl or methylene group is another reactant, which react with the reduced graphene oxide as the Friedel-Crafts actions and Scholl action. Preferably, to make the Friedel-Crafts actions and Scholl action happened rapidly, the mass ratio between the compound contains methyl or methylene group and reduced graphene oxide is 1:5~20.

Preferably, the compound contains methyl or methylene group is chosen from at least one of trioxymethylene, methanol, methyl chloride and methyl iodide. The methyl or methylene group of above are more active, they can react with reduced graphene oxide under mild conditions.

Preferably, before the step of reacting the first mixture in a microwave environment of which power is 300~900 w for 0.5~2 h, there is a step of adding a strong acid into the first mixture.

The strong acid can be used to depolymerize the compound contains methyl or methylene group, at the same time, it's a kind of electrophile, can be used as cocatalyst to help the first Lewis acid coordinating the reduced graphene oxide. The strong acid is chosen from at least one of sulfuric acid, methanesulfonic acid, benzenesulfonic acid, nitromethane, nitric acid, hydrochloric acid, trichloroacetic acid, perchloric acid. The mass concentration of the strong acid is 39%~98%. Preferably the strong acid is chosen from at least one of sulfuric acid, methanesulfonic acid, and is nitromethane.

Preferably, the mass ratio between the strong acid and reduced graphene oxide is 1:0.1~1.

After putting strong acid into the first mixture, ultrasonic dispersing under the power of 120 W~300 W for 0.5~4 h, to make the components uniformly dispersed, then reacting the first mixture in a microwave environment of which power is 300~900 W for 0.5~2 h, refluxing for 3~5 h and then do the separation and purification to obtain a first crude product.

Specific for the step of purification and drying is: obtain the precipitation by filtering and removing the solvent of reaction fluid, wash the precipitation by water once, and then wash the precipitation by ethanol for 1~2 times, drying, obtains the first crude product.

The first crude product is the reduced graphene oxide that been repaired preliminarily.

In the step of S110, by the catalyzing of the first Lewis acid, the Friedel-Crafts action. Scholl action occurred between reduced graphene oxide and the compound contains methyl or methylene group, so the vacancy defects and double vacancy defects have been repaired preliminarily and effectively.

Step S120: add the first crude product into the second Lewis acid, and add in the aromatic hydrocarbon repairing agent, and mix them evenly to get the second mixture, to get the molten solid, and obtain the second crude product by separation and purification.

The second Lewis acid is chosen from at least one of ferric chloride ($FeCl_3$) aluminum chloride ($AlCl_3$), zinc chloride ($ZnCl_2$), boron trifluoride ($BF_3$) magnesium chloride ($MgCl2.6H2O$), copper chloride ($CuCl2.2H_2O$), lithium chloride (LiCl). Preferably, the second Lewis acid is chosen from at least one of ferric chloride ($FeCl_3$), aluminum chloride ($AlCl_3$), and lithium Chloride (LiCl).

Preferably, the mass ratio between the first crude product and the second Lewis acid is 1:20~100.

The so called second Lewis acid is solid Lewis acid. Melt the solid Lewis acid, add the first crude product into it, and also add in the aromatic hydrocarbon repairing agent, to get the second mixture.

The aromatic hydrocarbon repairing agent is chosen from at least one of naphthalene, anthracene, phenanthrene, coronene, pyrene and perylene. Preferably, the aromatic hydrocarbon repairing agent is chosen from at least one of naphthalene, phenanthrene and perylene.

Preferably, the mass ratio between the first crude product and the aromatic hydrocarbon repairing agent is 1:5~10.

Reacting the second mixture, to get the molten solid.

Preferably, at the specific execution modes, the specific step to make the second mixture reacted to get the molten solid is: under 200° C.~300° C. making the second mixture react for 3~5 h, to get the molten solid.

Preferably, in another specific execution mode, the specific step to make the second mixture react is: put the second mixture into the microwave environment at the power of 300~800 W, reacting for 0.1~0.5 h, to get the molten solid.

The specific step of separation and purification is dispersing the molten solid into water and add the dilute sulfuric acid to adjust the pH to 5, then filter out the solvent by suction filtration, wash it by ethanol for 2~3 times, wash it by cyclohexane for once, then wash it with diluted hydrochloric, acid and water respectively to obtain the second crude product, which is the reduced graphene oxide has been moderate repaired.

In the step of S120, handled by the melt second Lewis acid, the larger sized defects of the preliminary repaired reduced graphene oxide are grafted and replenished through Friedel-Crafts action by aromatic hydrocarbon with large size, so the oversize vacancy defects of reduced graphene oxide have been repaired effectively.

At the same time, handled by the melt second Lewis acid, part of the Stone-Wales (SW) topological defects of reduced graphene oxide rearranged under the catalyzing of metal powder, thus, the penta cyclic-seven member cyclic structure turn back to hexagonal honeycomb pattern, the Stone-Wales (SW) topological defects of the preliminary repaired reduced graphene oxide decrease.

Further, handled by the melt second Lewis acid, part of the oxygen-containing functional groups of the preliminary repaired reduced graphene oxide were captured by the second Lewis acid, the deoxidization of reduced graphene oxide proceed, the carbon-oxygen ratio of reduced graphene oxide rises effectively.

In the step of S130, mixing the second crude product, a metal powder catalyst and a third Lewis acid together to obtain a third mixture, reacting the third mixture in the atmosphere of a protection gas containing a carbon source at a temperature of 450-500° C. for 1-2 hours, and annealing in a vacuum environment, at the temperature of 200° C.~350° C. for 5~8 hours, cooling to room temperature, to obtain a repaired reduced graphene oxide after separation and purification.

The first Lewis acid is chosen from at least one of ferrous chloride ($FeCl_2$), ferric chloride ($FeCl_3$), lithium chloride (LiCl), chromium trichloride ($CrCl_3$), cobalt dichloride ($CoCl_2$), zinc chloride ($ZnCl_2$) copper chloride ($CuCl_2.2H_2O$). Preferably, the first Lewis acid is chosen from at least one of chloride ferric ($FeCl_2$), chromium trichloride ($CrCl_3$) and ferric chloride ($FeCl_3$).

Preferably, the mass of the third Lewis acid is 0.1%~5% of the second crude product.

The metal powder catalyst is chosen from at least one of copper powder, zinc powders, silver powder, palladium powder and platinum powder.

Preferably, the metal powder catalyst is chosen from at least one of copper powder, zinc powders, silver powder, palladium powder and platinum powder with the size of 200 meshes. More preferably, the metal powder catalyst is chosen from at least one of nickel powder, palladium powder and platinum powder with the size of 200 meshes.

Preferably, the mass of metal powder catalyst is 5%~10% of the second crude product.

The atmosphere of a protection gas containing a carbon source is a mixture gas contains organic phase gas and inert gas. Of which, the organic phase gas is chosen from at least one of methane, ethylene and gaseous ethanol. The inert gas is argon or helium and so on.

As a supplement of carbon source, the organic phase gas can repair the vacancy defects and double vacancy defects with high-activity. The inert gas can prevent the adsorption of oxygen, prevent the graphene from oxidation.

Reacting the third mixture in the atmosphere of a protection gas containing a carbon source at a temperature of 450-500° C. for 1-2 hours, and annealing in a vacuum environment, at the temperature of 200° C.~350° C. for 5~8 hours, cooling to room temperature, to obtain the repaired reduced graphene oxide after separation and purification, the specific steps of above is:

Adding the third mixture into muffle furnace, let in the protection gas containing a carbon source, heat to 450° C.~500° C. and maintain it, reacting for 1~2 hours, shift to the vacuum oven, with the temperature of 200° C.~350° C., annealing for 5~8 hours, then cooling to room temperature, the repaired reduced graphene oxide obtained after separation and purification.

The specific of separation and purification is adding the mixture cooled to room temperature into water, undergoing ultrasonic dispersion for 2 hours, and do the suction filtration, wash the residue with hydrochloric acid of 10% mass concentration for 3~5 times, after vacuum filtration, collecting the residue, drying, obtain the repaired reduced graphene oxide.

In the step of S130, after the annealing process by metal powder catalyst, the remain Stone-Wales (SW) topological defects of moderate repaired reduced graphene oxide can be repaired, at the same time, the graphene have a further reforming in the surface of transition metal, activating the remaining vacancy defects and double vacancy defects.

In addition, with a supplying of carbon source, under the catalyzing of transition metal, the high-activity vacancy defects and double vacancy defects of moderate repaired reduced graphene oxide can be repaired, and the high-quality graphene obtained.

The method to repair reduced graphene oxide above, by the catalyzing of the first Lewis acid, the Friedel-Crafts action Scholl action occurred between reduced graphene oxide and the compound contains methyl or methylene group, so the vacancy defects and double vacancy defects have been repaired preliminarily and effectively; catalyzing by the second Lewis acid, the larger sized defects of the reduced graphene oxide are grafted and replenished through Friedel-Crafts action by aromatic hydrocarbon, so the vacancy defects of reduced graphene oxide have been repaired moderately, and reductive deoxygenation accomplished, after the annealing process by metal powder catalyst, the remain Stone-Wales (SW) topological defects of moderate repaired reduced graphene oxide can be repaired, at the same time, the graphene have a further reforming in the surface of transition metal, activating the remaining vacancy defects and double vacancy defects. In addition, with the supplying of carbon source, under the catalyzing of transition metal, the high-activity vacancy defects and double vacancy defects of moderate repaired reduced graphene oxide can be repaired, and the high-quality graphene obtained.

Further details of our present invention are described with specific embodiments below.

Embodiment 1

1. Wash the reduced graphene oxide with anhydrous ethanol and water in turn, then drying out. Add the washed and dried reduced graphene oxide into dichloromethane, obtained the reduced graphene oxide dispersion liquid, of which, the concentration of reduced graphene oxide is 1 mg/mL; Add the ferric chloride, aluminium chloride, and trioxymethylene into the reduced graphene oxide dispersion liquid to obtain the first mixture, of which, the mass ratio between ferric chloride and reduced graphene oxide is 1:3, the mass ratio between aluminium chloride and reduced graphene oxide is 1:3, the mass ratio between trioxymethylene and reduced graphene oxide is 1:5; add the 98% sulfuric acid into the first mixture, the mass ratio between sulfuric acid and reduced graphene oxide is 1:0.1; dispersing the first mixture in a supersonic with 120 w for 0.5 h, then reacting the mixture in a microwave with power 900 w for 2 hours, refluxing for 3 hours; after the reaction ended, filtering and removing the solvent, wash it with water and ethanol in turn for once, dried out to obtain the first crude product;

2. Melt the ferric chloride and aluminium chloride together with the mass ratio of 1:1, then add in the first crude product and naphthalene, mixing well to get the second mixture, of which, the mass ratio between the first crude product and ferric chloride is 1:10, the mass ratio between the first crude product and aluminium chloride is 1:10, the mass ratio between the first crude product and naphthalene is 1:5; reacting the second mixture in an airtight container for 5 hours under 200° C., to get the molten solid; separating the molten solid into water, add dilute sulphuric acid to adjust the pH to 5, filtering and removing the solvent, wash it by ethanol twice, cyclohexane once, diluted hydrochloric acid once, then water, drying, at last, the second crude product obtained.

3. Mixing the second crude product and the palladium powder with the size of 200 meshes homogeneously to get the third mixture, of which, the mass of palladium powder is 5% of the second crude product, the mass of ferric chloride is 5% of the second crude product; add the second mixture into muffle, ventilating the mixing gas of argon and methane, heating to 450° C., maintain for 2 h, then transfer into the vacuum oven, annealing for 8 hours under the temperature of 200° C., cooling to room temperature, of which, the volume ratio between methane and argon is 1:9; add the mixture of room temperature into water, ultrasonic dispersing for 2 hours under the power of 120 W, wash the filter residue with hydrochloric acid which mass ratio is 10% for 3 times, removing the catalyst completely then filter, get the residue, drying, to obtained the reduced graphene oxide after repaired.

According to the determination, the carbon-oxygen ratio of unrepaired reduced graphene oxide is 8:1, but it can rise to 23:1 after repaired. This can be sure that the oxygen content of repaired reduced graphene oxide reduced greatly.

The electric conductivity of the reduced graphene oxide raises from 30~90 S/cm to 500~650 S/cm after repaired, which means the electrical resistivity reduced effectively after repaired, the repairment of the defect makes reduced graphene oxide higher quality. To sum up, we can obtain the high-quality graphene materiel after repairment process.

Embodiment 2

1. Wash the reduced graphene oxide with anhydrous ethanol and water in turn, then drying out. Add the washed and dried reduced graphene oxide into 1,2-dichloroethane, obtained the reduced graphene oxide dispersion liquid, of which, the concentration of reduced graphene oxide is 0.1 mg/mL; Add the aluminium chloride, zinc chloride, and trioxane into the reduced graphene oxide dispersion liquid to obtain the first mixture, of which, the mass ratio between aluminium chloride and reduced graphene oxide is 1:5, the mass ratio between zinc chloride and reduced graphene oxide is 1:5, the mass ratio between trioxane and reduced graphene oxide is 1:20; add the 95% methanesulfonic acid into the first mixture, the mass ratio between methanesulfonic acid and reduced graphene oxide is 1:1; ultrasonic dispersing the first mixture and methanesulfonic acid under the power of 220 W for 1 hour, and then reacting the first mixture in a microwave environment of which power is 900 w for 0.5 hours, refluxing for 5 hours; after the reaction ended, filtering and removing the solvent, wash it with water once and ethanol twice, dried out to obtain a first crude product;

2. Melt the magnesium chloride, then add in the first crude product and phenanthrene, mixing well to get the second mixture, of which, the mass ratio between the first crude product and magnesium chloride is 1:100, the mass ratio between the first crude product and phenanthrene is 1:10; reacting the second mixture in an airtight container for 3 hours under 350° C., to get the molten solid; separating the molten solid into water, add dilute sulphuric acid to adjust the pH to 5, filtering and removing the solvent, wash it by ethanol for 3 times, cyclohexane once, diluted hydrochloric acid once, then water at last, the second crude product obtained.

3. Mixing the second crude product, ferrous chloride, chromic chloride and the nickel powder with the size of 200 meshes homogeneously to get the third mixture, of which, the mass of nickel powder is 10% of the second crude product, the mass of ferrous chloride is 1% of the second crude product, the mass of chromic chloride is 1% of the second crude product; add the second mixture into muffle, pass over the mixing gas of argon and ethylene, heating to 500° C., maintain for 1 h, then transfer into the vacuum oven, annealing for 5 hours under the temperature of 350° C., cooling to room temperature, of which, the volume ratio between ethylene and argon is 3:7; add the mixture of room temperature into water, ultrasonic dispersing for 2 hours under the power of 120 W, wash the filter residue with hydrochloric acid which mass ratio is 10% for 5 times, removing the catalyst completely then filtering, getting the residue, drying, to obtained the reduced graphene oxide after repaired.

According to the determination, the carbon-oxygen ratio of unrepaired reduced graphene oxide is 7:1, but it can rise to 24:1 after repaired. This can be sure that the oxygen content of repaired reduced graphene oxide reduced greatly.

The electric conductivity of the reduced graphene oxide raises from 30~90 S/cm to 500~650 S/cm after repaired, which means the electrical resistivity reduced effectively after repaired, the repairment of the defect makes reduced graphene oxide higher quality. To sum up, we can obtain the high-quality graphene material after repairment process.

Embodiment 3

1. Wash the reduced graphene oxide with anhydrous ethanol and water in turn, then drying out. Add the washed and dried reduced graphene oxide into mixed solvent consist of nitrobenzene and trichloromethane with the volume ratio of 1:1, obtained the reduced graphene oxide dispersion liquid, of which, the concentration of reduced graphene oxide is 0.5 mg/mL; Add the copper chloride and methanol into the reduced graphene oxide dispersion liquid to obtain the first mixture, of which, the mass ratio between copper chloride and reduced graphene oxide is 1:3, the mass ratio between methanol and reduced graphene oxide is 1:10; add the 68% benzenesulfonic acid into the first mixture, the mass ratio between benzenesulfonic acid and reduced graphene oxide is 1:0.5; ultrasonic dispersing the first mixture and benzenesulfonic acid under the power of 300 W for 1 hour, reacting the first mixture in a microwave environment of which power is 600 w for 1 hour, refluxing for 4 hours; after the reaction ended, filtering and removing the solvent, to obtain the sediment, wash it with water once and ethanol in turn for twice, dried out to obtain a first crude product;

2. Melt the ferric chloride and lithium chloride together with the mass ratio of 1:1, then add in the first crude product and mixture of phenanthrene and perylene with a mass ratio of 1:1, homogeneous mixing to get the second mixture, of which, the mass ratio between the first crude product and ferric chloride is 1:25, the mass ratio between the first crude product and lithium chloride is 1:25, the mass ratio between the first crude product and phenanthrene is 1:4; the mass ratio between the first crude product and perylene is 1:4; reacting the second mixture in an airtight container for 4 hours under 300° C., to get the molten solid; separating the molten solid into water, add dilute sulphuric acid to adjust the pH to 5, filtering and removing the solvent, wash it by ethanol for 3 times, cyclohexane once, diluted hydrochloric acid once, at last, water for once, the second crude product obtained.

3. Mixing the second crude product, the nickel powder and platinum powder both with the size of 200 meshes homogeneously to get the third mixture, of which, the mass of nickel powder and platinum powder is 4% of the second crude product, the mass of chromic chloride is 1% to that of the second crude product; add the second mixture into muffle, pass over the mixing gas of argon and gaseous ethanol, heating to 500° C., maintain for 1 h, then transfer into the vacuum oven, annealing for 6 hours under the temperature of 250° C., cooling to room temperature, of which, the volume ratio between gaseous ethanol and argon is 2:8; add the mixture of room temperature into water, ultrasonic dispersing for 2 hours under the power of 120 W, wash the filter residue with hydrochloric acid which mass ratio is 10% for 5 times, removing the catalyst completely then filter, get the residue, drying, to obtained the reduced graphene oxide after repaired.

According to the determination, the carbon oxygen ratio of unrepaired reduced graphene oxide is 8:1, but it can rise to 19:1 after repaired. This can be sure that the oxygen content of repaired reduced graphene oxide reduced greatly.

The electric conductivity of the reduced graphene oxide raises from 30~90 S/cm to 500~600 S/cm after repaired, which means the electrical resistivity reduced effectively after repaired, the repairment of the defect makes reduced graphene oxide higher quality. To sum up, we can obtain the high-quality graphene material after repairment process.

Embodiment 4

1. Wash the reduced graphene oxide with anhydrous ethanol and water in turn, then drying out. Add the washed and dried reduced graphene oxide into nitrobenzene, obtained the reduced graphene oxide dispersion liquid, of which, the concentration of reduced graphene oxide is 0.7 mg/mL; Add the copper chloride and chloromethane into the reduced graphene oxide dispersion liquid to obtain the first mixture, of which, the mass ratio between copper chloride and reduced graphene oxide is 1:6, the mass ratio between chloromethane and reduced graphene oxide is 1:15; add the 39% hydrochloric acid into the first mixture, the mass ratio between hydrochloric acid and reduced graphene oxide is 1:0.2; ultrasonic dispersing the first mixture and hydrochloric acid under the power of 150 W for 4 hours, reacting the first mixture in a microwave environment of which power is 700 w for 1.5 hours, refluxing for 4 hours; after the reaction ended, filtering and removing the solvent, to obtain the sediment, wash it with water once and ethanol in turn for twice, dried out to obtain a first crude product;

2. Melt the lithium chloride, then add in the first crude product and mixture of naphthalene and phenanthrene with a mass ratio of 1:1, homogeneous mixing to get the second mixture, of which, the mass ratio between the first crude product and lithium chloride is 1:40; the mass ratio between the first crude product and naphthalene is 1:3.5; the mass ratio between the first crude product and phenanthrene is 1:3.5; reacting the second mixture in a microwave environment of which power is 300 w for 0.5 hours, to get the molten solid; separating the molten solid into water, add dilute sulphuric acid to adjust the pH to 5, filtering and removing the solvent, wash it by ethanol for 2 times, cyclohexane once, diluted hydrochloric acid once, at last, water for once, the second crude product obtained.

3. Mixing the second crude product, the palladium powder with the size of 200 meshes and copper chloride homogeneously to get the third mixture of which, the mass of palladium powder is 6% of the second crude product, the mass of copper chloride is 0.5% to that of the second crude product; add the second mixture into muffle, pass over the mixing gas of argon, methane and ethylene, heating to 480° C., maintain for 1.5 hours, then transfer into the vacuum oven, annealing for 6.5 hours under the temperature of 280° C., cooling to room temperature, of which, the volume ratio between methane, ethylene and argon is 1.5:1.5:7; add the mixture of room temperature into water, ultrasonic dispersing for 2 hours under the power of 120 W wash the filter residue with hydrochloric acid which mass ratio is 10% for 5 times, removing the catalyst completely then filtering, get the residue, drying, to obtained the reduced graphene oxide after repaired.

According to the determination, the carbon oxygen ratio of unrepaired reduced graphene oxide is 6:1, but it can rise to 20:1 after repaired. This can be sure that the oxygen content of repaired reduced graphene oxide reduced greatly.

The electric conductivity of the reduced graphene oxide raises from 30~40 S/cm to 430~550 S/cm after repaired, which means the electrical resistivity reduced effectively after repaired, the repairment of the defect makes reduced graphene oxide higher quality. To sum up, we can obtain the high-quality graphene material after repairment process.

Embodiment 5

1. Wash the reduced graphene oxide with anhydrous ethanol and water in turn, then drying out. Add the washed and dried reduced graphene oxide into nitrobenzene, obtained the reduced graphene oxide dispersion liquid, of which, the concentration of reduced graphene oxide is 0.6 mg/mL; Add the boron trifluoride and methyl iodide into the reduced graphene oxide dispersion liquid to obtain the first mixture, of which, the mass ratio between boron trifluoride and reduced graphene oxide is 1:4, the mass ratio between methyl iodide and reduced graphene oxide is 1:8; add the 40% nitromethane into the first mixture, the mass ratio between nitromethane and reduced graphene oxide is 1:0.3; ultrasonic dispersing the first mixture and nitromethane under the power of 250 W for 3 hours, reacting the first mixture in a microwave environment of which power is 800 w for 1.8 hours, refluxing for 4.5 hours; after the reaction ended, filtering and removing the solvent, to obtain the sediment, wash it with water once and ethanol in turn for twice, dried out to obtain a first crude product;

2. Melt the aluminium chloride, then add in the first crude product and coronene homogeneous mixing to get the second mixture, of which, the mass ratio between the first crude product and aluminium chloride is 1:60; the mass ratio between the first crude product and coronene is 1:6; reacting the second mixture in a microwave environment of which power is 800 w for 0.1 hours, to get the molten solid; separating the molten solid into water, add dilute sulphuric acid to adjust the pH to 5, filtering and removing the solvent, wash it by ethanol for 2 times, cyclohexane once, diluted hydrochloric acid once, at last, water for once, the second crude product obtained.

3. Mixing the second crude product, the platinum powder with the size of 200 meshes and cobalt chloride homogeneously to get the third mixture, of which, the mass of platinum powder is 8% of the second crude product, the mass of cobalt chloride is 2% to that of the second crude product; add the second mixture into muffle, pass over the mixing gas of argon and methane, heating to 460° C., maintain for 1.8 hours, then transfer into the vacuum oven, annealing for 7 hours under the temperature of 300° C., cooling to room temperature, of which, the volume ratio between methane and argon is 2:8; add the mixture of room temperature into water, ultrasonic dispersing for 2 hours under the power of 120 W, wash the filter residue with hydrochloric acid which mass ratio is 10% for 5 times, removing the catalyst completely then filter, get the residue, drying, to obtained the reduced graphene oxide after repaired.

According to the determination, the carbon oxygen ratio of unrepaired reduced graphene oxide is 6:1, but it can rise to 21:1 after repaired. This can be sure that the oxygen content of repaired reduced graphene oxide reduced greatly.

The electric conductivity of the reduced graphene oxide raises from 30~40 S/cm to 460~600 S/cm after repaired, which means the electrical resistivity reduced effectively after repaired, the repairment of the defect makes reduced graphene oxide higher quality. To sum up, we can obtain the high-quality graphene material after repairment process.

Embodiment 6

1. Wash the reduced graphene oxide with anhydrous ethanol and water in turn, then drying out. Add the washed and dried reduced graphene oxide into normal hexane, obtained the reduced graphene oxide dispersion liquid, of which, the concentration of reduced graphene oxide is 0.3 mg/mL; Add the boron aluminium chloride and methyl iodide into the reduced graphene oxide dispersion liquid to obtain the first mixture, of which, the mass ratio between boron aluminium chloride and reduced graphene oxide is 1:5, the mass ratio between methyl iodide and reduced graphene oxide is 1:12; add the 98% sulfuric acid and 95% methylsulfonic acid into the first mixture, the mass ratio between sulfuric acid and reduced graphene oxide is 1:0.3; the mass ratio between methylsulfonic acid and reduced graphene oxide is 1:0.3; ultrasonic dispersing the first mixture, sulfuric acid and methylsulfonic acid under the power of 180 W for 2.5 hours, reacting the first mixture in a microwave environment of which power is 500 w for 2 hours, refluxing for 4 hours; after the reaction ended, filtering and removing the solvent, to obtain the sediment, wash it with water once and ethanol in turn for twice, dried out to obtain a first etude product;

2. Melt the boron trifluoride, then add the first crude product into boron fluoride, and add in pyrene, homogeneous mixing to get the second mixture, of which, the mass ratio between the first crude product and boron trifluoride is 1:70; the mass ratio between the first crude product and pyrene is 1:9; reacting the second mixture in a microwave environment of which power is 500 w for 0.3 hours, to get the molten solid; separating the molten solid into water, add dilute sulphuric acid to adjust the pH to 5, filtering and removing the solvent, wash it by ethanol for 2 times, cyclohexane once, diluted hydrochloric acid once, at last, water for once, the second crude product obtained.

3. Mixing the second crude product, the palladium powder with the size of 200 meshes and zinc chloride homogeneously to get the third mixture, of which, the mass of palladium powder is 7% of the second crude product, the mass of zinc chloride is 0.1% to that of the second crude product; add the second mixture into muffle, pass over the mixing gas of argon, methane and ethylene, heating to 470° C., maintain for 1.5 hours, then transfer into the vacuum oven, annealing for 5.5 hours under the temperature of 320° C., cooling to room temperature, of which, the volume ratio between methane, argon and ethylene is 1:1:8; add the mixture of room temperature into water, ultrasonic dispersing for 2 hours under the power of 120 W wash the filter residue with hydrochloric acid which mass ratio is 10% for 5 times, removing the catalyst completely then filter, get the residue, drying, to obtained the reduced graphene oxide after repaired.

According to the determination, the carbon oxygen ratio of unrepaired reduced graphene oxide is 8:1, but it can rise to 25:1 after repaired. This can be sure that the oxygen content of repaired reduced graphene oxide reduced greatly.

The electric conductivity of the reduced graphene oxide raises from 30~90 S/cm to 560~650 S/cm after repaired, which means the electrical resistivity reduced effectively after repaired, the repairment of the defect makes reduced graphene oxide higher quality. To sum up, we can obtain the high-quality graphene material after repairment process.

The embodiments above are only a part of executive modes for our invention, they are specific and detailed, and no one can restrict the protection scope of our present invention through those modes. Any insubstantial change and replacement based on our present invention by technical staff in this field all belongs to the protection scope required by our invention. The protection scope of this invention is subject to the claims.

The invention claimed is:

1. A method for repairing reduced graphene oxide, the method comprising the following steps:
dispersing the reduced graphene oxide into a solvent to obtain a graphene dispersion liquid, adding a first Lewis acid and a compound containing a methyl or methylene group to obtain a first mixture, reacting the first mixture in a microwave environment of which power is 300-900 W for 0.5-2 hours, refluxing for 3-5 hours; separating, purifying and drying to obtain a first crude product;

adding the first crude product into a second Lewis acid and adding an aromatic hydrocarbon repairing agent to obtain a second mixture, reacting the second mixture to obtain a molten solid, separating and purifying the molten solid to obtain a second crude product; and, mixing the second crude product, a metal powder catalyst and a third Lewis acid to obtain a third mixture, reacting the third mixture in the atmosphere of a protection gas containing a carbon source at a temperature of 450-500° C. for 1-2 hours, and annealing in a vacuum environment for 5-8 hours under a temperature of 200° C.-350° C., cooling to a room temperature, separating and purifying to obtain a repaired reduced graphene oxide.

2. The method of claim 1, wherein the solvent is selected from the group consisting of dichloromethane, 1,2-dichloroethane, carbon tetrachloride, trichloromethane, cyclohexane, normal hexane, benzene and nitrobenzene.

3. The method of claim 1, wherein the concentration of the reduced graphene oxide in the graphene dispersion liquid is 0.1 mg/mL-1 mg/mL.

4. The method of claim 1, wherein the first Lewis acid and the second Lewis acid are both selected from the group consisting of ferric chloride, aluminium chloride, boron trifluoride, magnesium chloride, copper chloride, and lithium chloride, the third Lewis acid is selected from the group consisting of ferric ferrous chloride, ferric chloride, lithium chloride, chromic chloride, cobalt dichloride, zinc chloride and copper chloride.

5. The method of claim 1, wherein a mass ratio between the first Lewis acid and the reduced graphene oxide is 1:3-10.

6. The method of claim 1, wherein the compound containing the methyl or methylene group is selected from the group consisting of trioxymethylene, methanol, chloromethane and methyl iodide.

7. The method of claim 1, wherein a mass ratio between the compound containing the methyl or methylene group and the reduced graphene oxide is 1:5-20.

8. The method of claim 6, wherein prior to the step of reacting the first mixture in a microwave environment of which the power is 300-900 W for 0.5-2 hours, a step of adding a strong acid into the first mixture is conducted, wherein a mass ratio between the strong acid and the reduced graphene oxide is 1:0.1-1.

9. The method of claim 8, wherein the strong acid is selected from the group consisting of sulfuric acid, methylsulfonic acid, benzenesulfonic acid, nitromethane, nitric acid, hydrochloric acid, trichloroacetic acid and perchloric acid.

10. The method of claim 1, wherein a mass ratio between the first crude product and the second Lewis acid is 1:20-100.

11. The method of claim 1, wherein the aromatic hydrocarbon repairing agent is selected from the group consisting of naphthalene, anthracene, phenanthrene, coronene, pyrene and perylene.

12. The method of claim 1, wherein a mass ratio between the aromatic hydrocarbon repairing agent and the first crude product is 1:5-10.

13. The method of claim 1, wherein reacting the second mixture to obtain a molten solid comprises:

reacting the second mixture for 3-5 hours under a temperature of 200° C.-350° C.; or reacting the second mixture in a microwave environment of which power is 300-800 w for 0.1-0.5 hours.

14. The method of claim 1, wherein a mass of metal powder catalyst is 5%-10% of the second crude product.

15. The method of claim 1, wherein the metal powder catalyst is selected from the group consisting of copper powder, zinc powder, silver powder, palladium powder and platinum powder.

16. The method of claim 1, wherein a mass of the third Lewis acid is 0.1%-5% of the second crude product.

17. The method of claim 1, wherein the protection gas containing a carbon source is composed of organic phase gas and inert gas, and the organic phase gas is selected from the group consisting of methane, ethylene and gaseous ethanol.

18. The method of claim 17, wherein a volume ratio between the organic phase gas and the inert gas is 1-3:7-9.

* * * * *